Nov. 7, 1933.  E. N. TRUMP  1,933,644
CENTRIFUGAL SEPARATION
Filed Jan. 6, 1931   2 Sheets-Sheet 1

Inventor
Edward N. Trump,
By  Mo. R. Coosdale
Attorney.

Nov. 7, 1933.       E. N. TRUMP        1,933,644
CENTRIFUGAL SEPARATION
Filed Jan. 6, 1931        2 Sheets-Sheet 2

Inventor:
Edward N. Trump,
By
Attorney.

Patented Nov. 7, 1933

1,933,644

UNITED STATES PATENT OFFICE 1,933,644

CENTRIFUGAL SEPARATION

Edward N. Trump, Syracuse, N. Y.

Application January 6, 1931. Serial No. 506,880

8 Claims. (Cl. 210—69)

The invention relates to continuous centrifugal separation. The object is to provide improved method and means for drying crystals, such as sugar, salt and various chemicals.

The invention comprises improved method and means for securing continuous operation, thereby avoiding the disadvantages of the usual practice of intermittent filling and emptying, which requires stopping or slowing down for each charge in order to scrape out the crystals or dried material from the perforated surface.

This scraping operation not only involves great labor, but is especially unsatisfactory when applied to materials which glaze under the operation of the scraper.

The invention therefore comprises improved method and means for regulating the discharge of the dried material, so that the operation may be continuous and the feed to the machine and the travel of material therethrough may be controlled by the discharge.

The construction and operation are such as to create three zones, a purging zone, a washing zone and a drying zone; all controlled and regulated by the rate of discharge of material, which may be adjusted from time to time as required.

The invention comprises a rotating basket having its walls at such angle to the axis of its rotation, that the material will slide on its natural slope, leaving a thin bed upon the perforated walls of the basket. The said sliding travel of material will be at such rate as to afford ample time for the centrifugal force to purge the liquor and dry it after washing. The speed of rotation will of course be such as to secure the desired centrifugal force.

In accordance with the present invention, with the desired rate of rotation of the basket, the travel of the material can be stopped entirely or adjusted to any reasonable rate of discharge. By a proper control of the discharge the basket may be kept full at all times.

The invention also comprises improvements in details of construction.

Referring to the drawings which illustrate merely by way of example, suitable means for effecting the invention;—

Similar numerals refer to similar parts throughout the several views.

Figure 1:
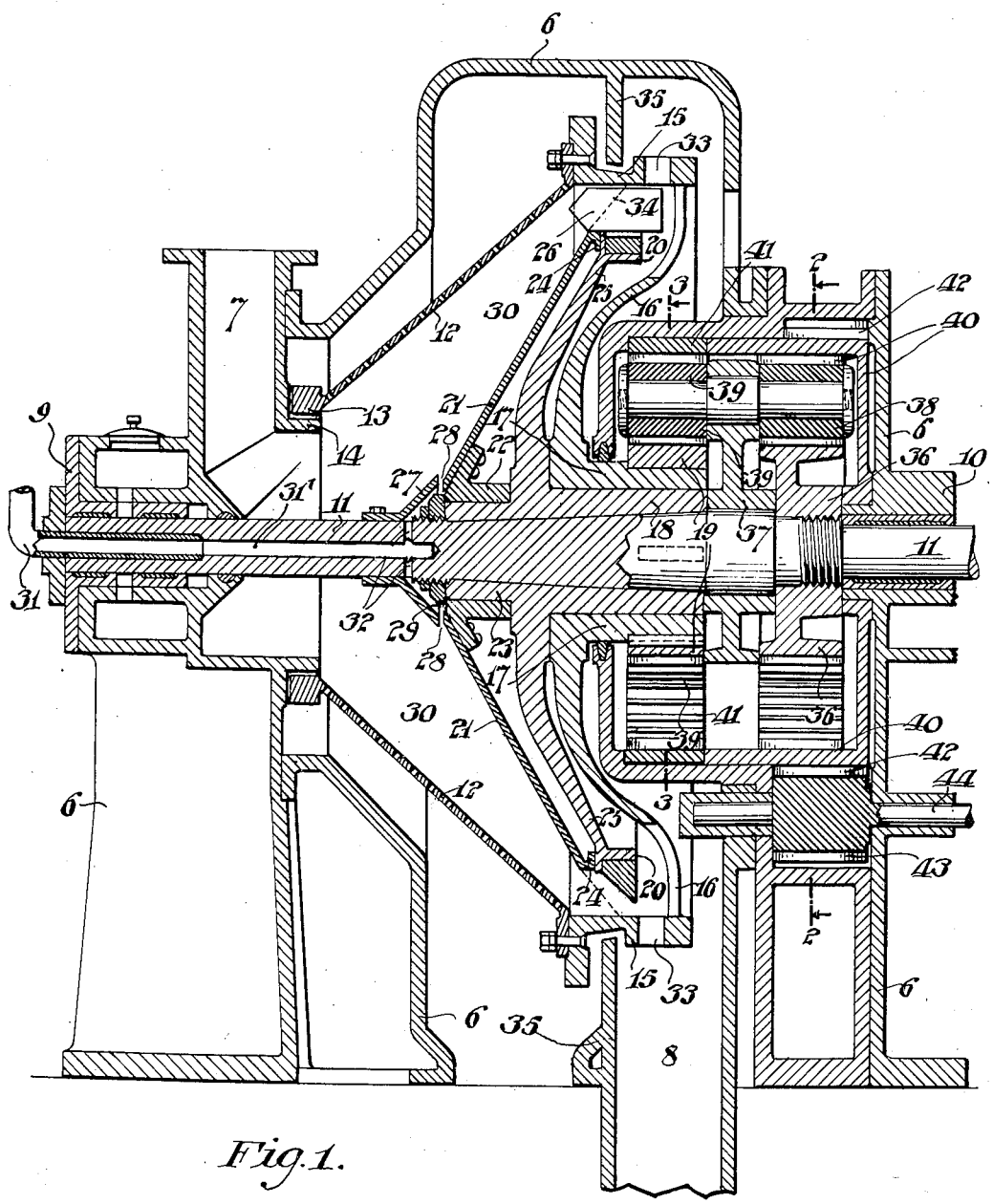
Fig. 1 is a section on the plane indicated by the line 1, 1 of Fig. 2.

The several parts of the housing are indicated by the numeral 6. This housing is provided with the inlet 7 for material to be treated, and the outlet 8 for the discharge of material which has been treated. The housing is also provided with the bearings 9 and 10 for the shaft 11. The shaft 11 is driven by a motor, or from other suitable source of power, not shown.

The conical perforated basket 12 is provided at its small end with the ring 13 surrounding but spaced from the cylindrical flange 14 provided by the housing. At its outer or larger end the basket is secured to the channeled ring 15 mounted on the disc 16 having the sleeve 17 rotatably mounted on the sleeve 18. This ring 15 has an internal surface approximately parallel with the axis of its rotation. Sleeve 17 carries the pinion 19 to which it is keyed.

An inner conical imperforate formation 21 is provided, at its inner or smaller end, with a flanged collar 22 loosely mounted on the sleeve 23, which is an extension of sleeve 18. The outer or larger end of the conical formation 21 is provided with a flange 24 which lies adjacent to the face of disc 25 near its periphery. This formation 21 is free to rotate in response to the frictional action of the material engaging therewith.

The disc 25 is provided with the sleeve 18 which is keyed to and driven by the shaft 11. This disc 25 is provided with a peripheral ring 20, to which is secured the deflecting knife or blade 26. This blade or deflector 26 is positioned at a suitable angle to the plane of rotation, preferably at about 30°.

The dotted line 34, extending beyond the outer edge of conical member 21, in Fig. 1, indicates the natural slope which the material assumes due to the centrifugal action. This is similar to the natural slope which the material assumes due to gravity when resting upon a horizontal platform.

Secured to shaft 11 is a smaller conical formation, which may be designated as the washing cone 27, having its larger face approaching but spaced from the small end of conical formation 21. The said space 28 forms a passage from the chamber 29, within the washing cone, to the space 30 between the basket 12 and the imperforate cone 21. A stationary pipe 31, connected with a source of supply not shown, delivers water through channel 31' and ports 32, provided in shaft 11, to chamber 29, whence it delivers through passage 28 to the space 30. The flow of water may be regulated by any suitable means, such as the usual water valve, not shown.

The ring 15 is provided with discharge ports 33 delivering material to outlet 8. An annular disc or partition 35 projects from the housing into the channel of ring 15 to separate the discharging liquid from the discharging material.

*Driving mechanism*

As above stated, the disc 25 is provided with the sleeve 18 keyed to the shaft 11. A pinion 36 is also keyed or threaded to shaft 11 and turns therewith.

Figure 2:
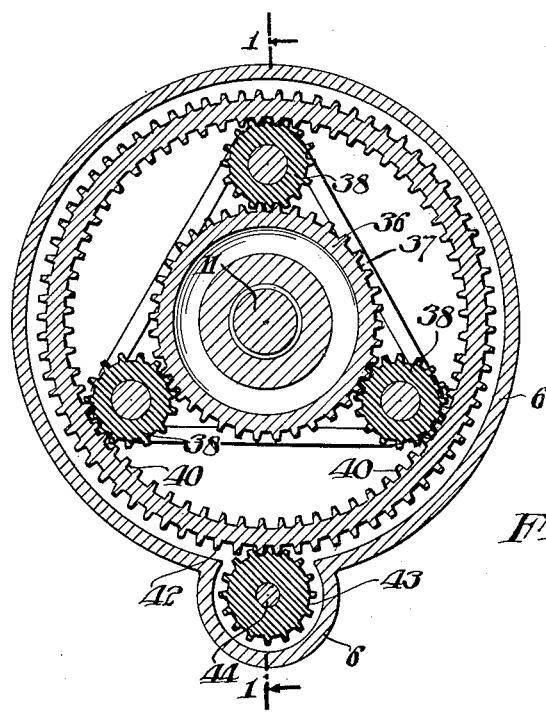
Fig. 2 is a cross-section on the line 2, 2 of Fig. 1.
Figure 3:
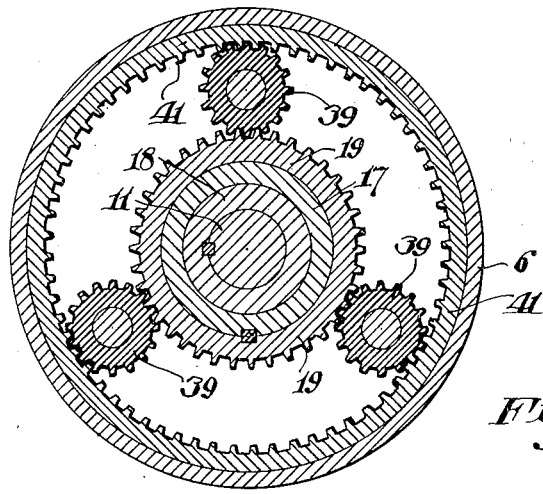
Fig. 3 is a cross-section on the line 3, 3 of Fig. 1.

A spider 37 is loosely mounted on shaft 11 between pinion 36 and sleeve 18. This spider is provided with a number of pins extending to the right and to the left thereof, on which are loosely mounted the planet pinions 38 and 39. These planet pinions will hereinafter be referred to for brevity, as planets. On the right hand side of the spider, Figs. 1 and 2, are the three planets 38, and on the left hand, Figs. 1 and 3, are the three planets 39. The planets 38 all gear with pinion 36 and also with the internal teeth of the ring gear 40, rotatably journalled in the housing 6. The three planets 39 all gear with the pinion 19 and also with the fixed or stationary internal annular rack 41 secured to the housing. The ring gear 40 is provided with external teeth 42 meshing with pinion 43 on shaft 44, driven from a suitable source of power, such as a variable speed motor not shown, which may be controlled so as to have any desired angular speed in either direction.

*In operation*

With the rotation of shaft 11, the pinion 36, turning therewith, operates the planets 38 to travel around the internal teeth of ring gear 40. If the ring gear 40 is held against rotation, then the planets 38, moving around the same, will carry the spider with them; this causes the planets 39 to travel around the internal circular rack 41. These planets 39 being also in mesh with pinion 19, will cause the rotation of this pinion and the sleeve 17 of disc 16 carrying the ring 15 of basket 12.

It will be obvious that, with such an arrangement, if the ring gear 40 is held stationary, the relative angular speed of rotation of basket 12 and deflector 16 will be constant.

When pinions 19 and 36 are the same size and planets 38 and 39 are all the same size, it follows that, with the ring gear 40 stationary, the basket 12 and the deflecting blade 16 will travel at the same angular speed.

The moment however that rotative movement is communicated to the ring gear 40 in either direction by means of pinion 43, then the planetary travel of the planets 38 and 39 is changed and consequently the actuation of pinion 19 will be different from that of shaft 11, that is the angular speed of basket 12 will differ from the the angular speed of deflector 16, and this difference of angular speed will depend entirely upon the direction and angular speed of actuation communicated to ring gear 40 by pinion 43.

It will thus be seen that by controlling the angular speed and direction of rotation of pinion 43, the relative movements of basket 12 and deflector 16, and the consequent rate of discharge of material from the basket can be controlled as required.

If the space 30, between the basket 12 and conical formation 21, is kept filled with material, no regulatable feed of material to the centrifugal is required. The forward travel of material through the machine due to centrifugal action, is controlled entirely by the rate of discharge, and this rate of discharge may be changed from time to time as desirable, in view of the character of the material operated upon, and the required characteristics of the product discharged from the machine.

The provision whereby the conical formation 21 may turn, due to the engagement therewith of the material whirling with the basket 12, facilitates the operation as a whole.

The operation upon the material fed into the device in accordance with the arrangement shown by way of example, is as follows:—

As the material enters the first zone of the rotating or whirling basket 12, the bulk of the liquor is purged therefrom, after which the material passes to the washing zone where a washing liquid is delivered thereto for washing the same, after which the material passes to the drying zone for the removal of all liquid therefrom.

As above indicated the perforated basket is provided with its walls at a required angle to the axis of rotation so that a thin bed of the material will be retained on the perforated surface, while the portion inside the angle of repose will move down said angle until it reaches the drying zone and the retaining ring 15. The thickness of this bed of material will vary in accordance with the natural slope of the material, which is being dried, but it is intended to have a greater thickness remain next to the small end of the basket than at the dry end. The sliding of the material upon itself does not seem to glaze the surface.

The discharge of the material from the drying zone may be so regulated, as above described, as to give the required periods of the material in the several zones, depending upon the character of material to be treated and the character required of the finished product, and without disturbing the continuous operation of the machine.

In other words, the material between the basket 12 and the inner cone 21, which is free to rotate with the material, will be held back by the edge of cone 21 and the ring 15, at the angle of its natural slope, until blade 26 moves a section of it over the edge of said ring 15. The space behind the blade will be filled by the material which slides down due to centrifugal force caused by the speed of rotation. The centrifugal force will first purge the liquor and then dry the material after it is passed through the washing zone.

In the example shown, the basket 12, is rotated on a horizontal axis. It will be obvious that this axis of rotation may be vertical with a regulatable drive either above or below the basket, by a variable speed motor, or from any other suitable source of power. The greater diameter of the basket may be uppermost or lowermost with the feed of material thereto at any desired point.

It will of course be understood, that when the direction of rotation of disc 25, carrying the blade 26, is changed, the angular direction of the blade 26 must be correspodingly changed.

What I claim is:—

1. In a centrifugal separator, the combination of a conical perforated basket having a ring adjacent its outer margin, the inner surface of which is approximately parallel with the axis of its rotation, a retaining cone within the basket spaced to prevent flow of material over the edge of the ring, a deflector blade and means for rotating the same to divert the material over the edge of the ring.

2. In a centrifugal separator, the combination of a conical perforated basket having a ring adjacent its outer margin, the inner surface of which is approximately parallel with the axis of its rotation, a retaining cone within the basket spaced to prevent flow of material over the edge of the ring, a deflector blade and regulatable means for rotating the same to divert the material over the edge of the ring.

3. The method of centrifugal separation, which consists in causing the continuous forward movement of material entirely through a drying zone solely by centrifugal action, and controlling the introduction of material to said centrifugal action by a regulatable control of the discharge of material which has passed through said drying zone.

4. The method of centrifugal separation, which consists in causing the continuous forward movement of material through purging, washing and drying zones, solely by centrifugal action, and controlling the introduction of material to said purging zone by a regulatable control of the discharge of material which has passed through the drying zone.

5. In a centrifugal separator, the combination of a rotatable conical basket flaring toward its discharge end, a retaining ring having an inner cylindrical periphery with one margin thereof adjacent and corresponding with the basket margin at its discharge end, said cylindrical surface adapted to receive and arrest the material discharged from the basket, and regulatable means for securing the required deflection from said arrested material.

6. In a centrifugal separator, the combination of a rotatable conical basket flaring toward its discharge end, a retaining ring having an inner cylindrical periphery with one margin thereof adjacent and corresponding with the basket margin at its discharge end, said cylindrical surface adapted to receive and arrest the material discharged from the basket, a conical formation within the basket flaring in the same direction and loosely mounted to rotate in response to the frictional action of the material thereon and having a margin for cooperation with the retaining ring in defining the plane of natural slope of said arrested material, and regulatable means for securing the required deflection from said arrested material.

7. In a centrifugal separator, the combination of a rotatable shaft, a deflector-carrying formation mounted to rotate with the shaft, a ring-carrying formation loosely mounted on said shaft and having a geared relation with the shaft, a conical basket having a flaring discharge end, a retaining ring having a margin of its inner periphery adjacent to and corresponding with the margin of the discharge end of the basket, a deflector adapted to sweep the inner periphery of the ring, and arbitrarily operated means for regulating the geared relationship between the said shaft and the ring-carrying formation.

8. In a centrifugal separator, the combination of a rotatable shaft, a deflector-carrying formation mounted to rotate with the shaft, a ring-carrying formation loosely mounted on said shaft and having a geared relation with the shaft, a conical basket having a flaring discharge end, a retaining ring having a margin of its inner periphery adjacent to and corresponding with the margin of the discharge end of the basket, a conical formation within the basket loosely mounted to respond to the frictional action thereon of the material and having a margin at its larger end adapted to cooperate with the inner peripheral surface of the ring to define the position of natural slope of material delivered to the ring, and a deflector adapted to sweep said inner peripheral surface.

EDWARD N. TRUMP.